M. ANACKER.
DOUBLE WALLED VESSEL.
APPLICATION FILED JUNE 27, 1908.

919,517.

Patented Apr. 27, 1909.

Witnesses:

Inventor:
Max Anacker
by attorneys

UNITED STATES PATENT OFFICE.

MAX ANACKER, OF BERLIN, GERMANY, ASSIGNOR TO AMERICAN THERMOS BOTTLE COMPANY, OF BROOKLYN, NEW YORK.

DOUBLE-WALLED VESSEL.

No. 919,517.　　　Specification of Letters Patent.　　　Patented April 27, 1909.

Application filed June 27, 1908. Serial No. 440,687.

*To all whom it may concern:*

Be it known that I, MAX ANACKER, a subject of the German Emperor, and resident of Berlin, Germany, have invented a new and useful Improvement in Double-Walled Vessels, of which the following is a specification.

This invention consists in a double walled vessel comprising inner and outer walls united with each other only at the mouth of the vessel and inclosing between them a rarefied space, and has for its object to provide a novel form of stiffening device interposed between the inner and outer walls at a distance from the mouth of the vessel.

Figure 1:
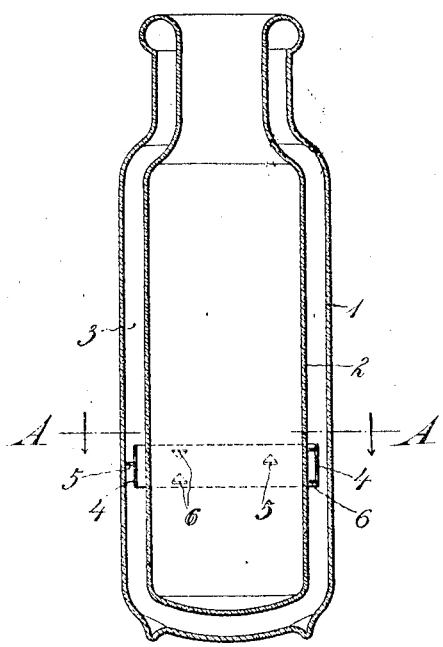
Figure 2:
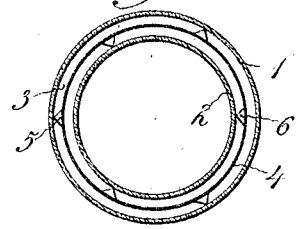
Figure 3:
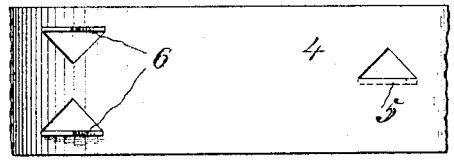
Figure 4:
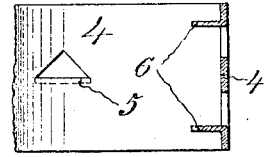

In the accompanying drawings, Figure 1 represents a double walled vessel in vertical central section with the improved stiffening device applied thereto, Fig. 2 is a section taken in the plane of the line A—A of Fig. 1, looking in the direction of the arrows, and Figs. 3 and 4 are enlarged detail views showing the manner of striking the lugs or ears from the opposite faces of the stiffening ring.

The outer wall of the vessel is denoted by 1, the inner wall by 2, and the rarefied space between the inner and outer walls by 3. These inner and outer walls are united with each other only at the mouth of the vessel.

A stiffening device for holding the inner wall spaced from the outer wall is provided, which device comprises a ring 4 spaced from both walls, said ring having outwardly projecting pointed lugs 5 struck therefrom for engaging the outer wall and inwardly projecting pointed lugs 6 struck therefrom for engaging the inner wall. By forming the lugs in the manner described, I am enabled to bend and so adjust their extremities nearer to or farther from the ring so as to compensate for differences in width of the annular rarefied space 3, due to inaccurate centering of the cylindrical walls, and thus to insure engagement of said lugs with said walls. The said lugs also, by reason of said construction, are resilient and thus afford an elastic support for the inner wall when said vessel is inclined from the vertical.

What I claim is:—

1. The combination with a double walled vacuum vessel, of a ring disposed in the space between the walls of said vessel and having outwardly and inwardly projecting lugs engaging with the outer and inner walls respectively.

2. The combination with a double walled vacuum vessel, of a ring disposed in the space between the walls of said vessel and having outwardly and inwardly projecting lugs formed integrally with said ring and engaging with the outer and inner walls respectively.

3. The combination with a double walled vacuum vessel, of a ring disposed in the space between the walls of said vessel and having outwardly and inwardly projecting flexible lugs engaging with the outer and inner walls respectively.

4. A stiffening device for vacuum double walled bottles comprising a ring and a plurality of projecting lugs on the inner and outer circumferential peripheries thereof.

5. A stiffening device for vacuum double walled bottles comprising a ring and a plurality of projecting resilient lugs on the inner and outer circumferential peripheries thereof.

6. A stiffening device for vacuum double walled bottles comprising a ring having on its periphery a plurality of lugs having their extremities adjustable with respect to said periphery.

7. A stiffening device for vacuum double walled bottles comprising a ring having on both its inner and outer circumferential peripheries, lugs having their extremities adjustable with respect to said peripheries.

In testimony, that I claim the foregoing as my invention, I have signed my name in presence of two witnesses, this eleventh day of June 1908.

MAX ANACKER.

Witnesses:
　HEINRICH RAUCHHOLZ
　HENRY HASPER.